(12) United States Patent
Smith

(10) Patent No.: US 6,237,863 B1
(45) Date of Patent: May 29, 2001

(54) DISENGAGEABLE WORM WHEEL GEARBOX

(75) Inventor: William F. Smith, 405 Morning Star La., Newport Beach, CA (US) 92660

(73) Assignee: William F. Smith, Newport Beach, CA (US)

(*) Notice: Subject to any disclaimer, the term of this patent is extended or adjusted under 35 U.S.C. 154(b) by 0 days.

(21) Appl. No.: 09/183,902

(22) Filed: Oct. 30, 1998

(51) Int. Cl.$^7$ .................................................. B05B 3/00
(52) U.S. Cl. .................... 239/722; 239/728; 239/741; 74/425; 74/606 R
(58) Field of Search ........................ 239/722, 726, 239/728, 732, 741, 742; 180/343, 371; 74/425, 606 R (56) References Cited

U.S. PATENT DOCUMENTS

| | | |
|---|---|---|
| 2,568,937 | 9/1951 | Stueland . |
| 2,646,213 | 7/1953 | Martin . |
| 2,747,423 | 5/1956 | Sanders . |
| 2,834,223 | 5/1958 | Strnad . |
| 3,048,051 | 8/1962 | Pickles . |
| 3,662,776 * | 5/1972 | Bryant et al. .................... 239/728 |
| 3,853,197 | 12/1974 | Quiram . |
| 3,901,337 | 8/1975 | Cragg . |
| 4,308,759 | 1/1982 | Sobotta . |
| 4,586,393 | 5/1986 | Mooney et al. . |
| 4,616,803 * | 10/1986 | Schils .................................... 74/425 |
| 4,683,770 | 8/1987 | Nettman . |
| 5,862,997 * | 1/1999 | Reinke .................................. 239/728 |

FOREIGN PATENT DOCUMENTS

| | | |
|---|---|---|
| 1099663 | 3/1966 | (GB) . |
| 1539436 | 1/1990 | (SU) . |

OTHER PUBLICATIONS

Fockink Industrias Electricas Ltda. Pivo Central Catalog, 1997.
Valmont Industries, Inc. Valley Rainger Catalog, 1978.
Lindsay Manufacturing Co. Zimmatic Catalog, date unknown.
UMC Customer Manual,Jul. 1998.

* cited by examiner

Primary Examiner—Lisa Ann Douglas
(74) Attorney, Agent, or Firm—Knobbe, Martens, Olson & Bear, LLP.

(57) ABSTRACT

A sealed worm wheel gearbox is provided having a worm disposed on a driveshaft. The worm engages a bull gear within the gearbox. Eccentric rotatable driveshaft mounts are mounted on opposite sides of the gearbox to support the driveshaft. The driveshaft axis of rotation is offset from the eccentric rotatable driveshaft mount axis of rotation. Thus, when the eccentric shaft mounts are rotated, the driveshaft moves linearly within the gearbox. In this way, rotation of the eccentric shaft mounts enables engagement and disengagement of the worm and bull gears.

42 Claims, 12 Drawing Sheets

DISENGAGEABLE WORM WHEEL GEARBOX

FIELD OF THE INVENTION

This invention relates to the field of gearboxes, and more particularly gearboxes in which a worm gear engages a bull gear.

BACKGROUND OF THE INVENTION

Worm wheel gearboxes are well known in the art. Such gearboxes are especially useful where low speed and high torque is desirable. Within these gearboxes, a worm gear engages a bull gear. Often, the worm gear is disposed on an input or drive shaft and the bull gear is linked to an output shaft. These worm wheel gearboxes are commonly used, for example, in agricultural automatic irrigation systems and potato pilers.

Large scale agricultural automatic irrigation systems typically comprise a system of sprinkler heads disposed on a truss or frame network. The trusses are linked together, enabling such irrigation systems to stretch to lengths of a thousand yards or more. The ground supports of the trusses are each disposed on a wheel or pair of wheels so that the entire irrigation system can be moved across a field. It is common for such irrigation systems to rotate about a center point, resulting in a substantially circular irrigating footprint. However, such irrigation systems may also be adapted to move in a straight line across rectangular fields.

Each wheel or pair of wheels supporting and transporting the irrigation system is driven by a dedicated motor. The motor drives a shaft which acts as the input shaft to a worm wheel gearbox. A worm gear disposed on the input shaft is engaged with a bull gear within such a gearbox. The bull gear is linked to an output shaft. The output shaft has an output flange which connects to the driven wheel. Rotation of the input shaft is thus transmitted via the gearbox to the output shaft, driving the wheels of the irrigation system. A typical automatic irrigation watering system has a number of such support wheels and each wheel or pair of wheels typically is driven by a dedicated motor and worm wheel gearbox as described. Worm wheel gearboxes are especially advantageous in this environment because once the drive motor stops, the worm and bull gear combination will allow very little backlash or coasting. Thus, the irrigation system will remain in its position even if it is on a hill.

The farm environment tends to be wet, muddy, silty and dusty. Thus, these gearboxes are sealed to prevent contamination of the gearbox contents.

As discussed above, worm wheel gearboxes are also commonly used in potato pilers. A potato piler comprises a conveyor disposed on a wheeled frame. To enable even piling of potatoes, the conveyor must be moved short, precise distances during operation. Potato pilers thus typically comprise a motor which rotatably drives a shaft and a worm wheel gearbox that transmits the shaft rotation to drive the wheels of the potato piler. This enables the potato piler to be moved short, precise distances when piling potatoes.

The need often arises to tow the units described above. For example, some farmers, in order to reduce costs, will use one irrigation system for a number of fields. Thus, it is necessary to tow the entire irrigation system from one field to another. Similarly, once a warehouse has been filled with potatoes, the potato piler must be transported to another warehouse. Thus, there is a need to tow the potato piler.

Worm wheel gearboxes are not adapted for easy towing. The gear ratios are best adapted for high-torque, low-speed situations. Accordingly, there is a need for a worm wheel gearbox that can be made to freewheel in order to ease towing.

The industry's standard solution to this towing problem is to attach a freewheeling hub and flange onto the output shaft of the worm wheel gearbox. This freewheeling flange is then connected to the driven unit's wheel. When the unit is being towed, this freewheeling flange allows the wheels to spin free.

To engage the wheel with the gearbox, a pin is pushed through aligned holes in both the output flange and the freewheeling flange so that the freewheeling flange and the wheel, which is attached thereto, are turned with the output flange. This approach has many limitations. First, the extra parts make this towable gearbox more expensive to manufacture than a non-towable gearbox. Also, it requires at least one loose part (pin) which can be lost. This approach also exerts the entire driving force of the motor and gearbox on the pin, resulting over time in pin failures. Maintenance costs are high, as is downtime and the risk of losing crops due to missed irrigation.

Another approach to solving the towing problem uses locking hubs similar to those used in four-wheel drive vehicles. However, this construction has proven too complex and expensive to be practical in this application.

SUMMARY OF THE INVENTION

Thus, there is a need in the art for an affordable, sealed, disengagable worm wheel gearbox which is adapted for high-torque, low-speed operation and can be operated in muddy, silty or wet environments without extensive maintenance.

The present invention satisfies this need in the art. A preferred embodiment of the present invention comprises a sealed worm wheel gearbox which enables full engagement and disengagement of the worm gear and bull gear.

The worm wheel gearbox comprises a gearbox housing having a pair of eccentric shaft supports rotatably mounted within the housing at opposing ends. These eccentric shaft supports each have a hole adapted to receive the driveshaft. The axis of rotation of the drive shaft when fit into the hole is offset from the axis of rotation of the eccentric shaft supports. Washers, O-rings and oil seals ensure that the gearbox is sealed, preventing gear oil from within the gearbox from leaking out of the gearbox and silt, mud and dust from the surrounding environment from entering the gearbox. Each eccentric shaft support further comprises a plurality of threaded bosses. These bosses receive fasteners which are used to attach a handle onto the eccentric shaft supports. Actuation of the handle causes the eccentric shaft supports to rotate.

Since the driveshaft is mounted along an axis which is offset from that of the eccentric shaft supports, rotation of the eccentric shaft supports results in linear movement of the driveshaft and the attached worm gear along a radius of curvature. The offset distance and angle of rotation of the eccentric shaft supports are configured so that the worm gear travels enough linear distance to completely disengage the teeth of the bull gear. Thus, by actuating the handle, the worm gear can be moved into and out of engagement with the bull gear. When the worm and bull gears are engaged, rotation of the driveshaft is transmitted to the output shaft via the gearbox. When the gears are disengaged, there is no rotation transmission.

End plates are attached onto opposing sides of the main body of the gearbox. Each end plate has a substantially circular hole which allows the eccentric shaft supports to extend therethrough. Each hole has a pair of ridges extending thereinto. When the eccentric shaft support is rotated, the threaded bosses contact a ridge and further rotation is prevented. A first ridge stops rotation in a first direction so that the worm gear does not become engaged too tightly with the bull gear. The other ridge stops rotation in a second direction in order to establish a stop point once the worm gear is disengaged from the bull gear.

A dust cap is provided to further discourage intrusion of matter such as dust, mud and silt into the seals of the eccentric shaft support or driveshaft. The dust cap is generally circular in shape and has an outer ridge that fits into a canal formed in the end cap. The dust cap is further adapted to surround and aid sealing of the driveshaft.

These and other objects, advantages and features of the present invention will be more fully understood and appreciated by reference to the written specification, the drawings and the claims.

DETAILED DESCRIPTION OF THE PREFERRED EMBODIMENT

Figure 1:
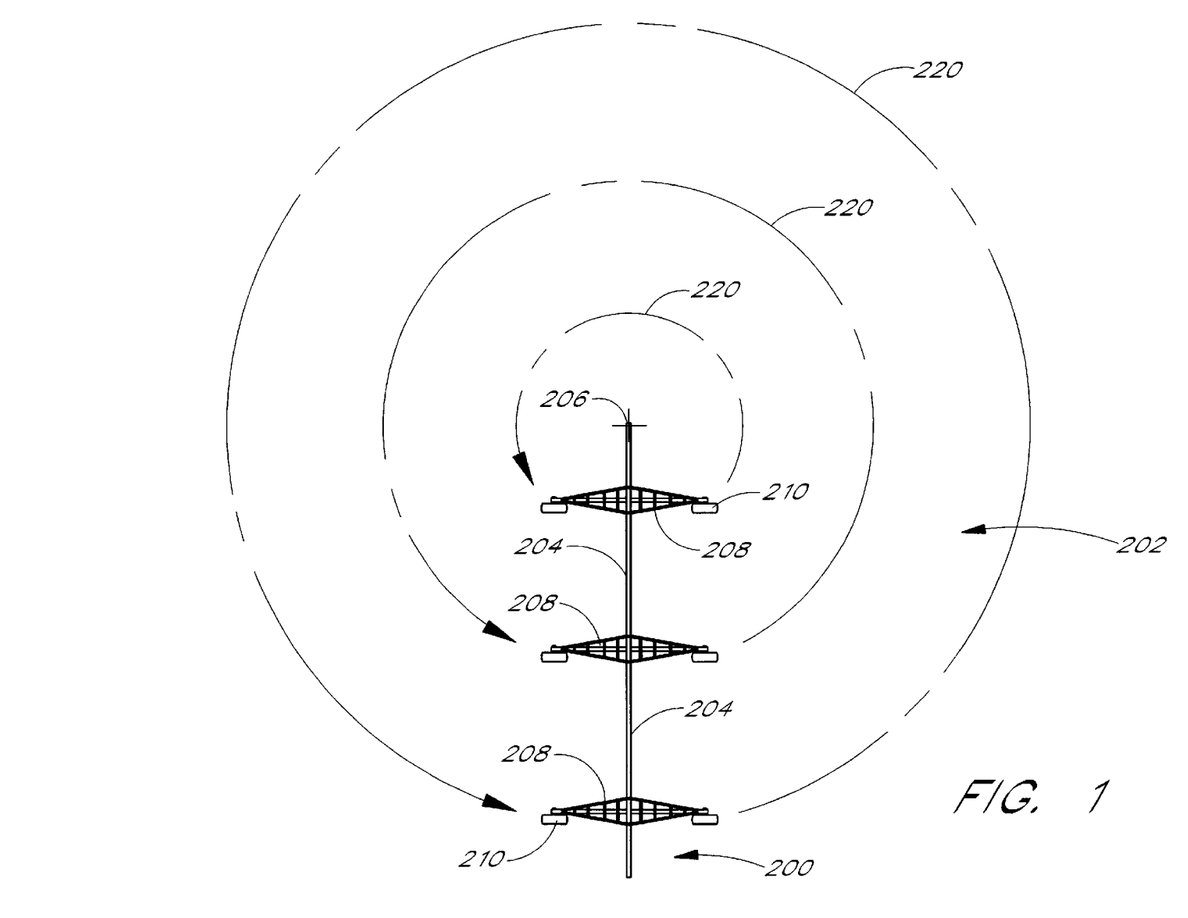
FIG. 1 is a top schematic view of an automatic irrigation system disposed in a circular crop field.
Figure 2:
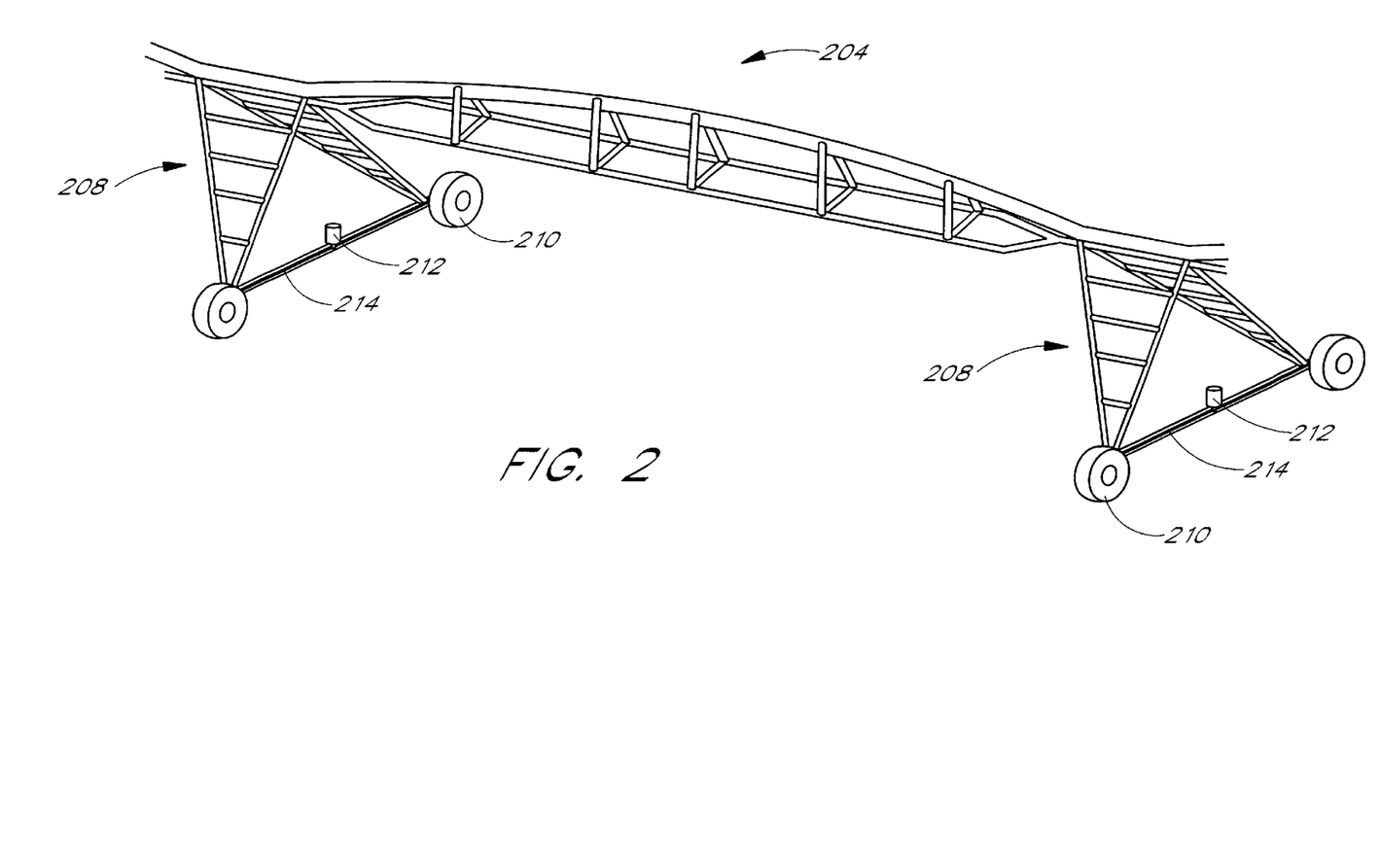
FIG. 2 is a perspective schematic view of one truss span of the irrigation system of FIG. 1.
Figure 3:
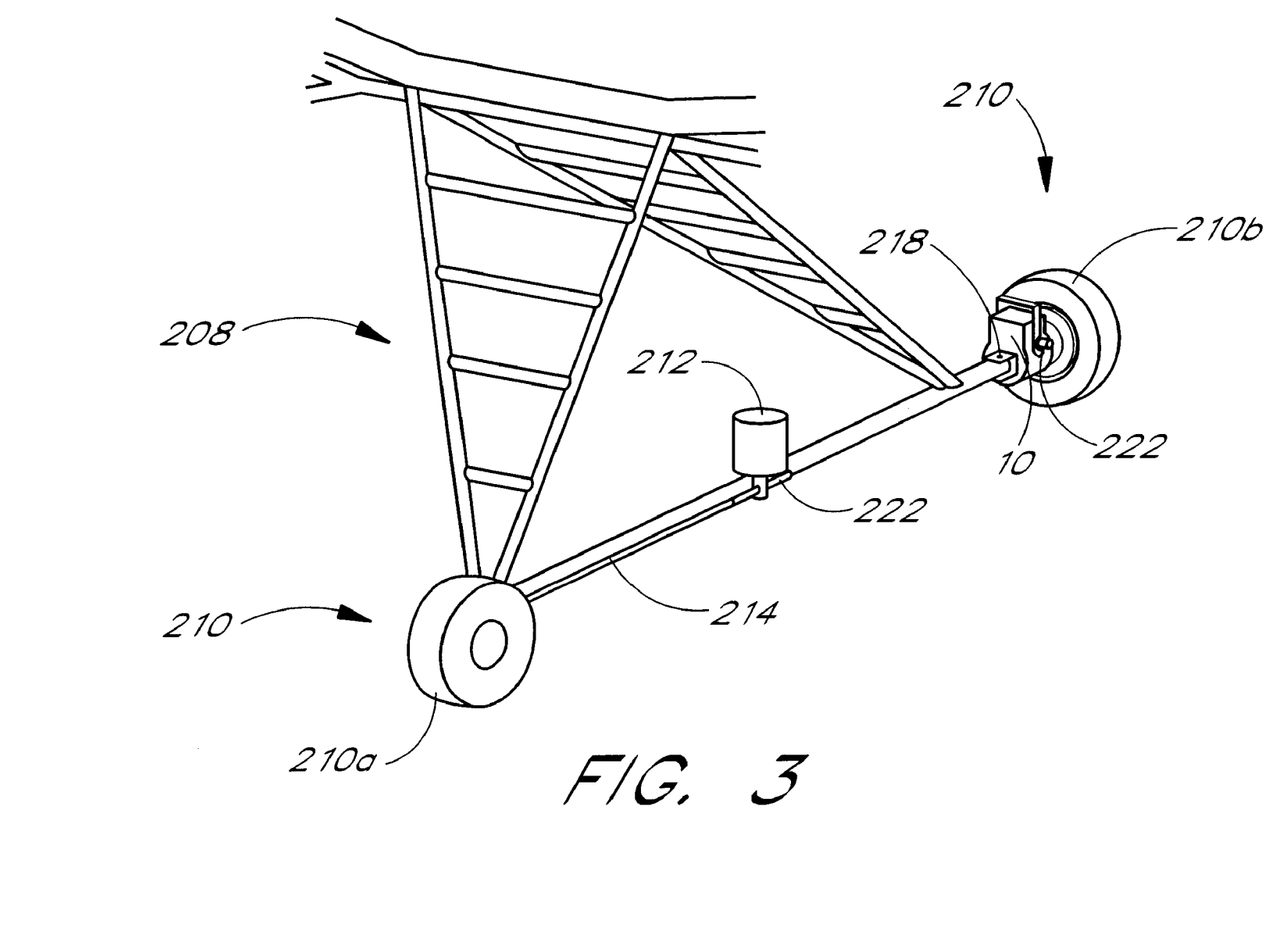
FIG. 3 is a perspective schematic view of a support tower of the irrigation system of FIG. 1, schematically showing one wheel in operating position and another in towable position.

Referring first to FIGS. 1–3, a schematically-shown automatic irrigation system 200 is provided disposed in a circular crop field 202. The irrigation system 200 comprises a plurality of truss spans 204 linked together end to end, and supports a sprinkler system (not shown). Support towers 208 are disposed between truss spans 204, linking the spans 204 together and providing ground support. Each tower 208 is disposed on a pair of wheels 210, which are oriented to roll in a direction generally perpendicular to the direction in which the truss spans 204 extend. Motors 212 are disposed on the towers 208. Each motor 212 communicates through an axle 214 to gearboxes 10 disposed at each wheel 210. Thus, each pair of wheels 210 is driven by a dedicated motor 212. The irrigation system 200 is preferably pivotably attached to a center pivot 206 in the circular crop field 202. As the motors 212 on the towers 208 drive the wheels 210, the wheels 210 follow circular tracks 220 in the crop field 202 and the entire irrigation system 200 rotates through the field 202. Thus, the irrigation system 200 enables automated watering of the crop field 202.

Preferably, the automatic irrigation system 200 is adapted to be towable to another field. Such towing necessitates first turning the wheels 210 so that they are oriented to roll in a direction parallel to the truss spans 204. FIG. 3 shows a tower 208 having one wheel 210a in the normal operating direction, and another wheel 210b towably oriented to roll parallel to the truss span 204. Both wheels 210 must be oriented as wheel 210b for the irrigation system 200 to be in a towable condition.

To reorient the wheels 210, the axle 214 is first disconnected at connect points 222 and removed. A pivot point 218 is formed on each bottom corner of the tower 208. The gearbox 10 is mounted to the tower 208 at this pivot point 218 and adapted to rotate about the pivot point 218 in a manner known in the art. The wheel 210b is disposed on the gearbox 10. As the pivot point 218 is rotated, the gearbox 10 and the attached wheel 210b are correspondingly rotated. When the wheel 210b has been rotated to the suitable towing orientation, the pivot point 218 is secured from further rotation using a locking pin or clip (not shown) as is known in the art.

Figure 4:
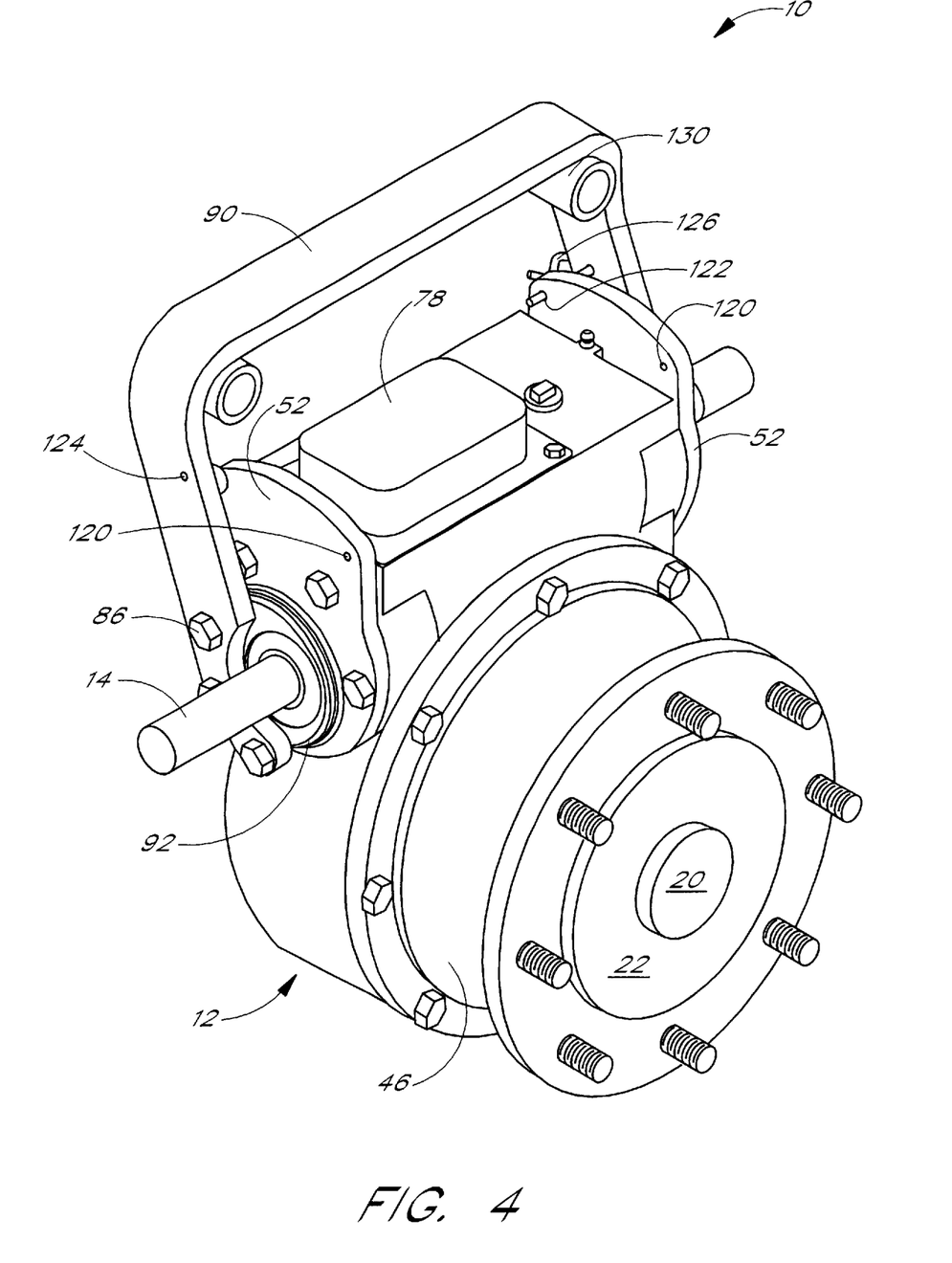
FIG. 4 is a perspective view of a preferred embodiment of the disengageable worm wheel gearbox of the present invention.
Figure 5:
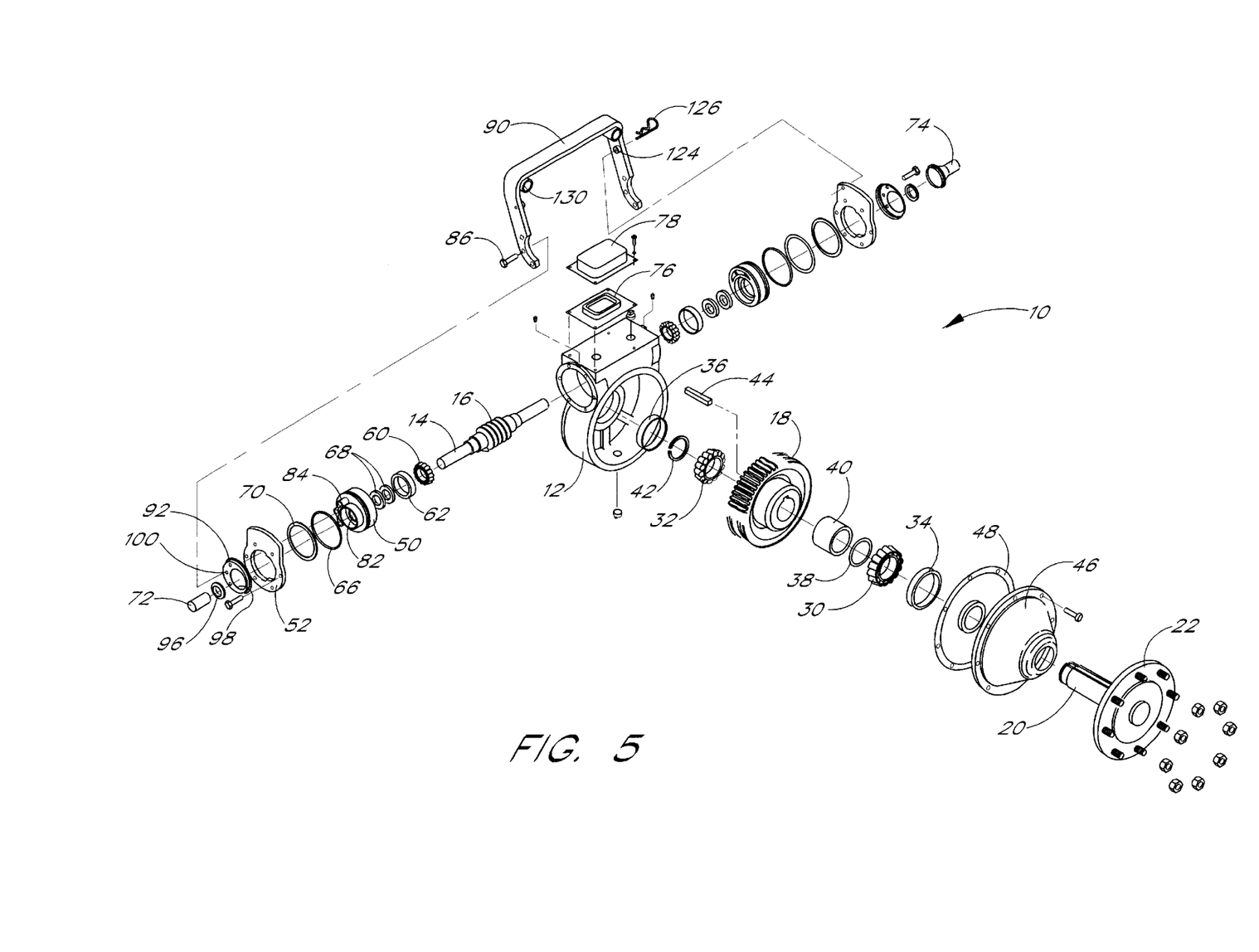
FIG. 5 is an exploded view of the gearbox of FIG. 1.

Referring next to FIGS. 4–5, a worm wheel gearbox 10 is shown in more detail. The worm wheel gearbox 10 preferably comprises a gearbox housing 12, a driveshaft 14 having a worm gear 16 disposed thereon, and a bull gear 18 in driving relation with an output shaft 20. The worm gear 16 engages the bull gear 18 within the gearbox housing 12. The output shaft 20 is connected to an output flange 22 which can be attached to a wheel.

The bull gear 18 and output shaft 20 are arranged in the gearbox housing 12 to provide for transfer of torque. Bearings 30, 32, bearing cups 34, 36, a shim 38 and a spacer 40, as well as a snap ring 42 and a key 44 reduce friction and facilitate efficient rotation of the bull gear 18 and output shaft 20. A gearbox cover 46 is attached to the housing 12. A gasket 48 accomplishes a seal.

The driveshaft 14 is supported by a pair of rotatably mounted eccentric shaft supports 50. An end plate 52 is mounted onto either side of the housing 12. Each end plate 52 holds a corresponding eccentric shaft support 50 in place within the housing 12. Bearings 60, bearing cups 62, washers 64, 0-rings 66, oil seals 68, and shims 70 are utilized to facilitate sealing of the gearbox and efficient rotation and support of the driveshaft 14. A shaft sleeve 72 is disposed on the portion 13a of the driveshaft 14 extending from the gearbox 10 and linking to the axle 214. A hub cap 74 completely covers the portion 13b of the driveshaft 14 extending from the other side of the gearbox 10. Either portion 13a, 13b of the driveshaft 14 can be linked to the axle 214.

The bull gear 18 preferably rotates once for every fifty rotations of the worm gear 16. To enable this 50:1 ratio, the worm gear 16 is constructed having a one inch diameter shaft 14 (the portions 13a, 13b extending from the gearbox housing 12) and having a pitch diameter of 2.0000 inches, a helix angle of 4 degrees, 46 minutes, and a pressure angle of 14.5 degrees. The pitch diameter is a well-defined term in the art which is roughly defined as the diameter of the worm gear, including a portion of the teeth. The corresponding bull gear 18 has fifty teeth, a pitch diameter of 8.3333 inches, and shares the pressure angle of 14.5 degrees. When engaged, the teeth of the gears overlap 0.320 inches. It is contemplated that varying sizes of bull/worm gear pairs may be appropriately used in implementing this invention.

A gear oil bath lubricates the contents of the gearbox 10. During use, this gear oil may become hot and expand, increasing oil pressure. A rubber diaphragm 76 disposed on the top of the gearbox 10 expands to relieve growing oil pressure. A steel cover 78 encases the rubber diaphragm 76.

Figure 6:
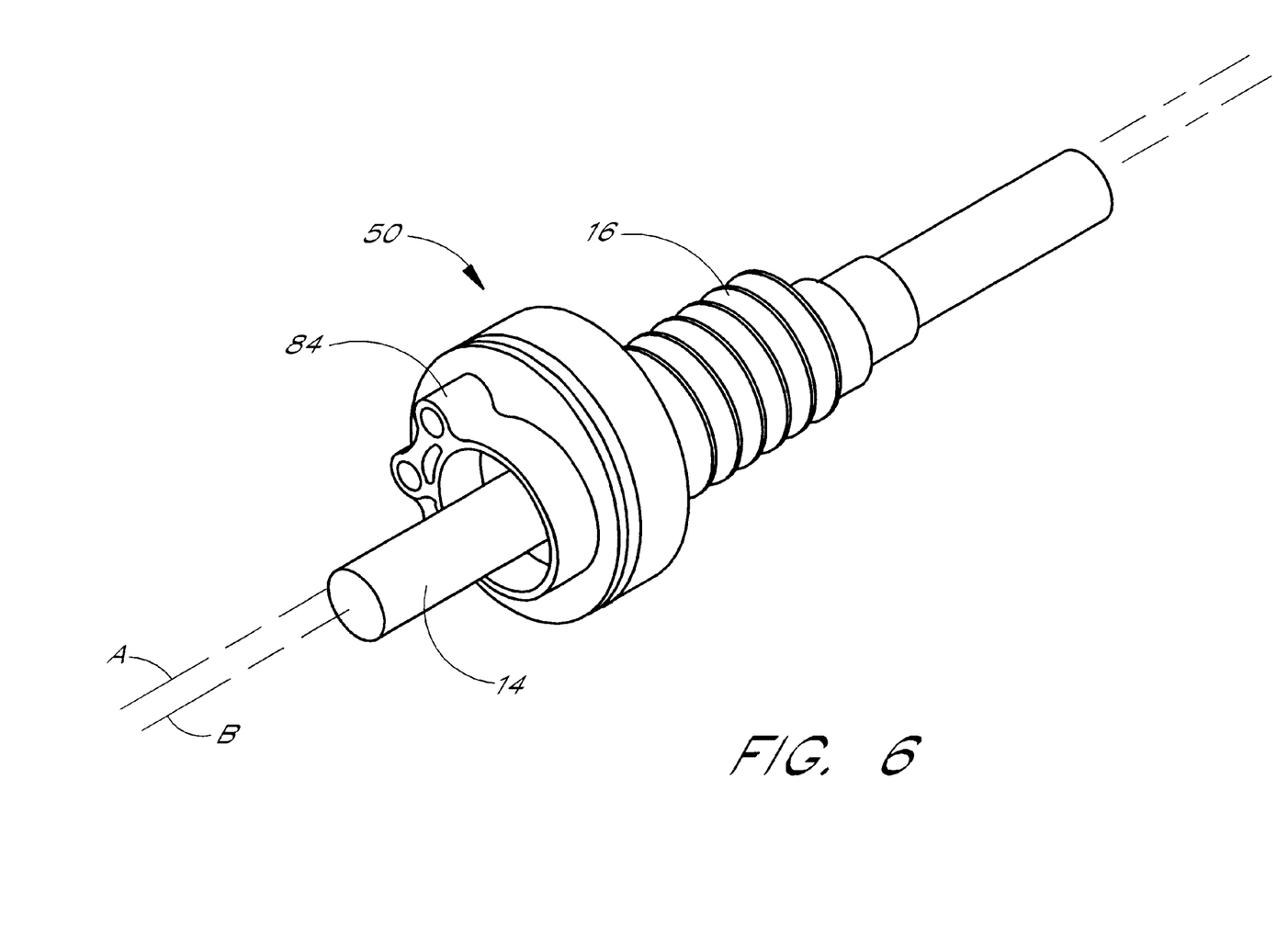
FIG. 6 is a perspective view of an eccentric shaft support coupled with a driveshaft.

Referring also to FIG. 6, a perspective view of an eccentric shaft support 50 is shown with the driveshaft 14 disposed therein. The eccentric shaft support mount 50 is generally cylindrical in shape. A cylindrical acceptor portion 80 of the gearbox housing 12 is complementary to, accepts and facilitates rotation of the eccentric shaft support 50 with respect to the gearbox 10. The surface between the gearbox 10 and the rotatable driveshaft mount 50 forms a smooth bearing surface. The eccentric shaft support 50 rotates about an axis of rotation A.

The driveshaft 14 fits through and is disposed in a shaft hole 82 formed in the eccentric shaft support 50. This shaft hole 82 is disposed eccentrically in the eccentric shaft support 50. Thus, the driveshaft axis of rotation B is offset from the eccentric shaft support axis of rotation A. As shown in FIG. 5, a second identical eccentric shaft support 50 is disposed in a cylindrical acceptor portion 80 on the opposite side of the gearbox housing 12 and similarly accepts and supports the driveshaft 14.

Each eccentric shaft support 50 further comprises threaded bosses 84. Preferably, threaded fasteners 86 engaged with the bosses 84 attach a handle 90 to the eccentric shaft support 50. The handle 90 preferably extends between and is attached to both eccentric shaft supports 50. Actuation of the handle 90 rotates the eccentric shaft supports 50.

Figure 7:
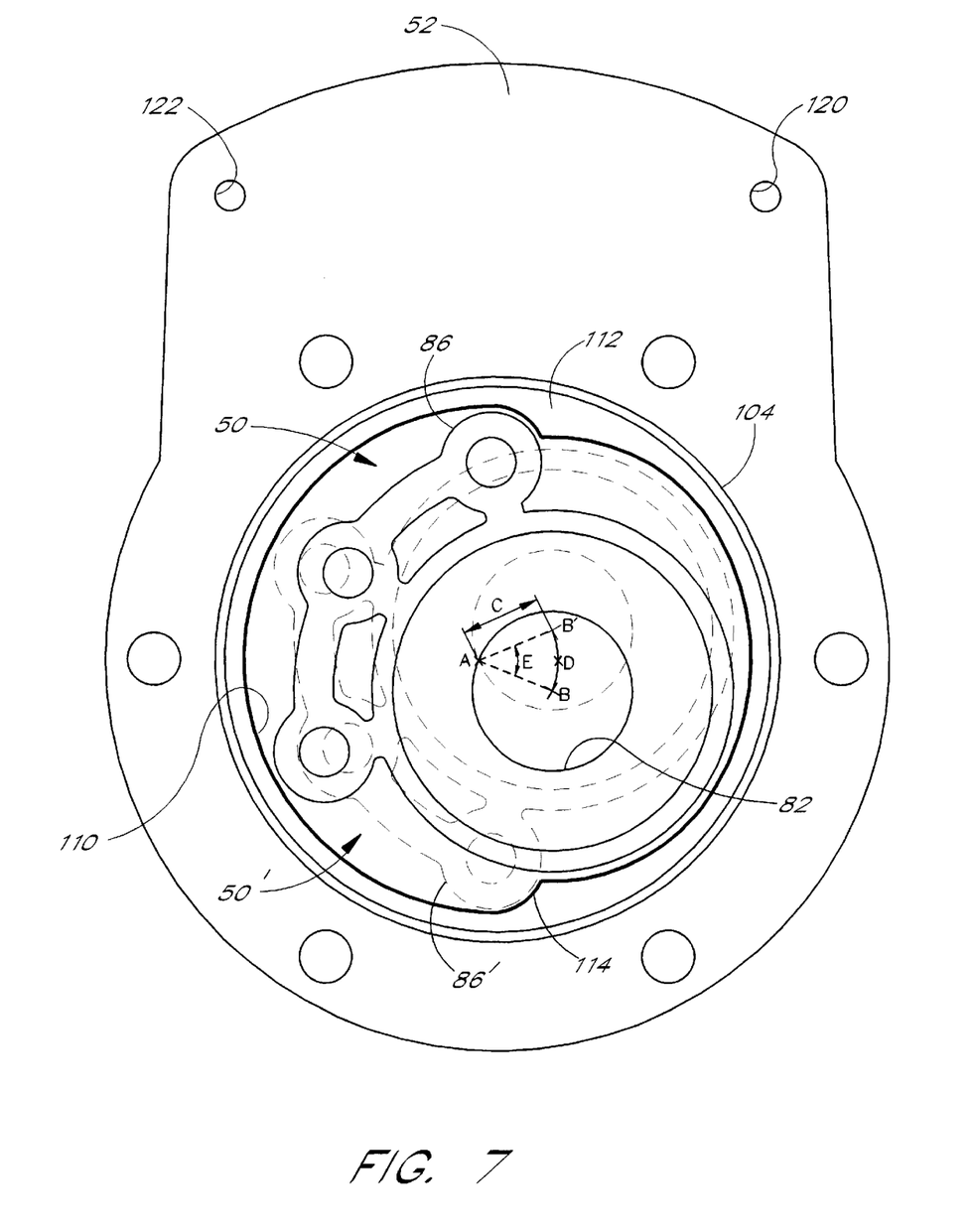
FIG. 7 is an end view of the gearbox showing an end plate, driveshaft, and eccentric shaft support and having the handle and dust cap removed to show the rotation stops and both the engaged and disengaged positions of the eccentric shaft support.

FIG. 7 shows an end view of an end plate 52 and the eccentric shaft support 50 disposed therebehind. This figure also illustrates the rotational movement of the eccentric shaft support 50. Since the shaft mounting hole 82 is disposed eccentrically within the eccentric driveshaft support mount 50, the driveshaft axis of rotation B is offset a distance C from the eccentric shaft support axis of rotation A. When the eccentric shaft support 50 is rotated, the driveshaft 14 moves linearly along an arcuate path D.

Figure 8:
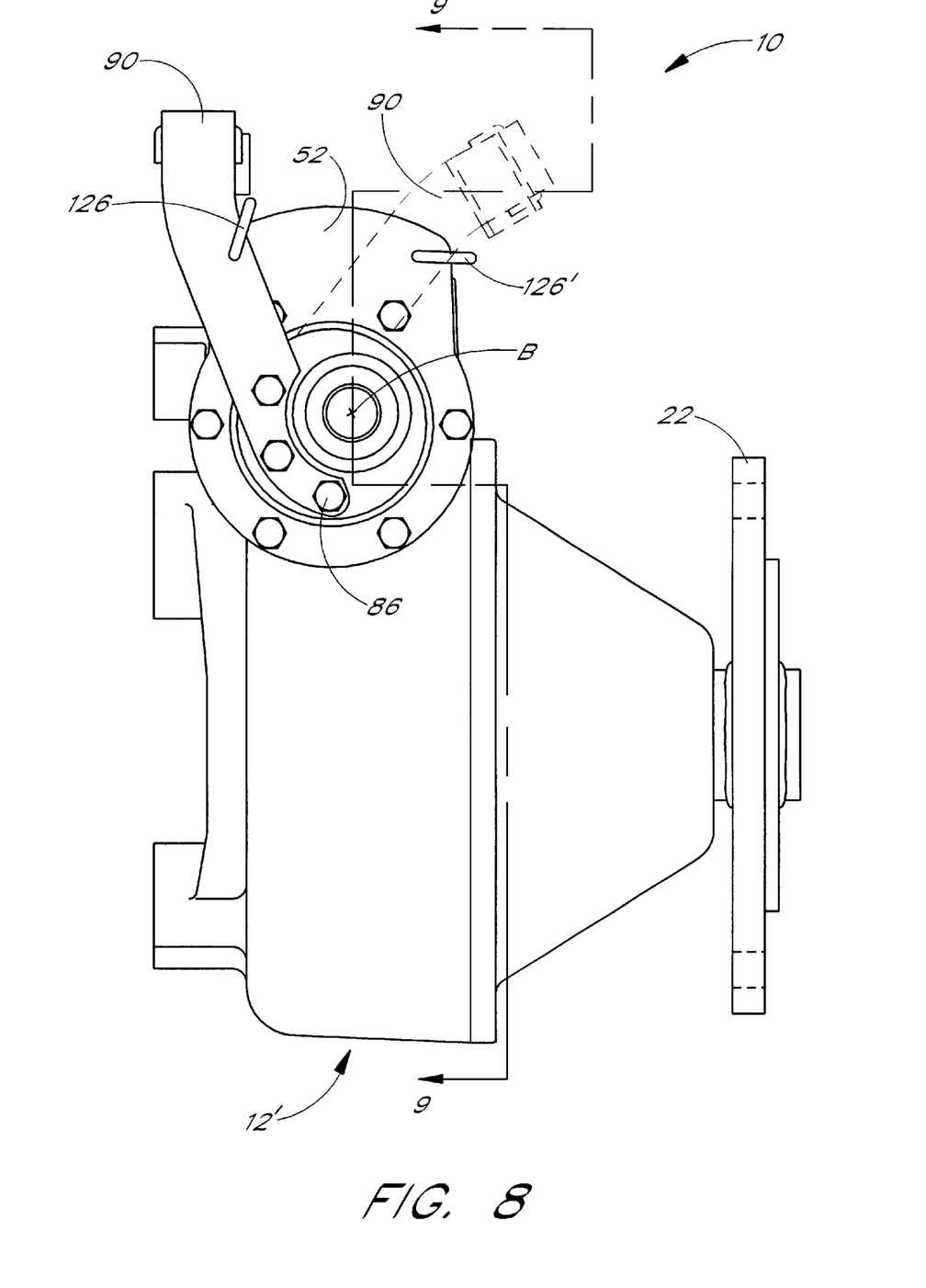
FIG. 8 is a side view of the gearbox of FIG. 1.
Figure 9A:
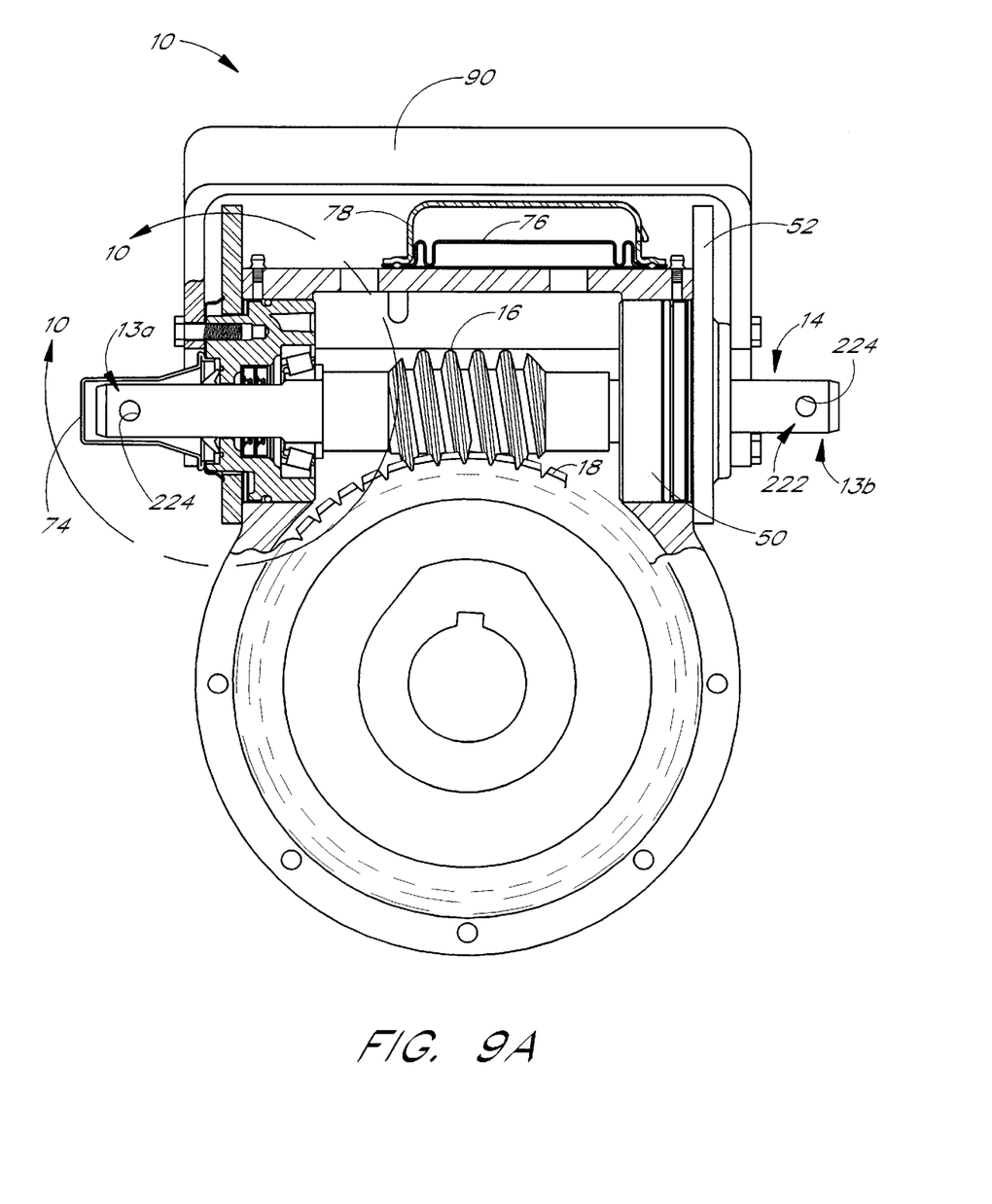
FIG. 9A is a partially cut-away front view of the gearbox of FIG. 1 showing the worm and bull gears in the engaged drive position. The cut away and cross-sectional view is taken along line 9—9 of FIG. 8.
Figure 9B:
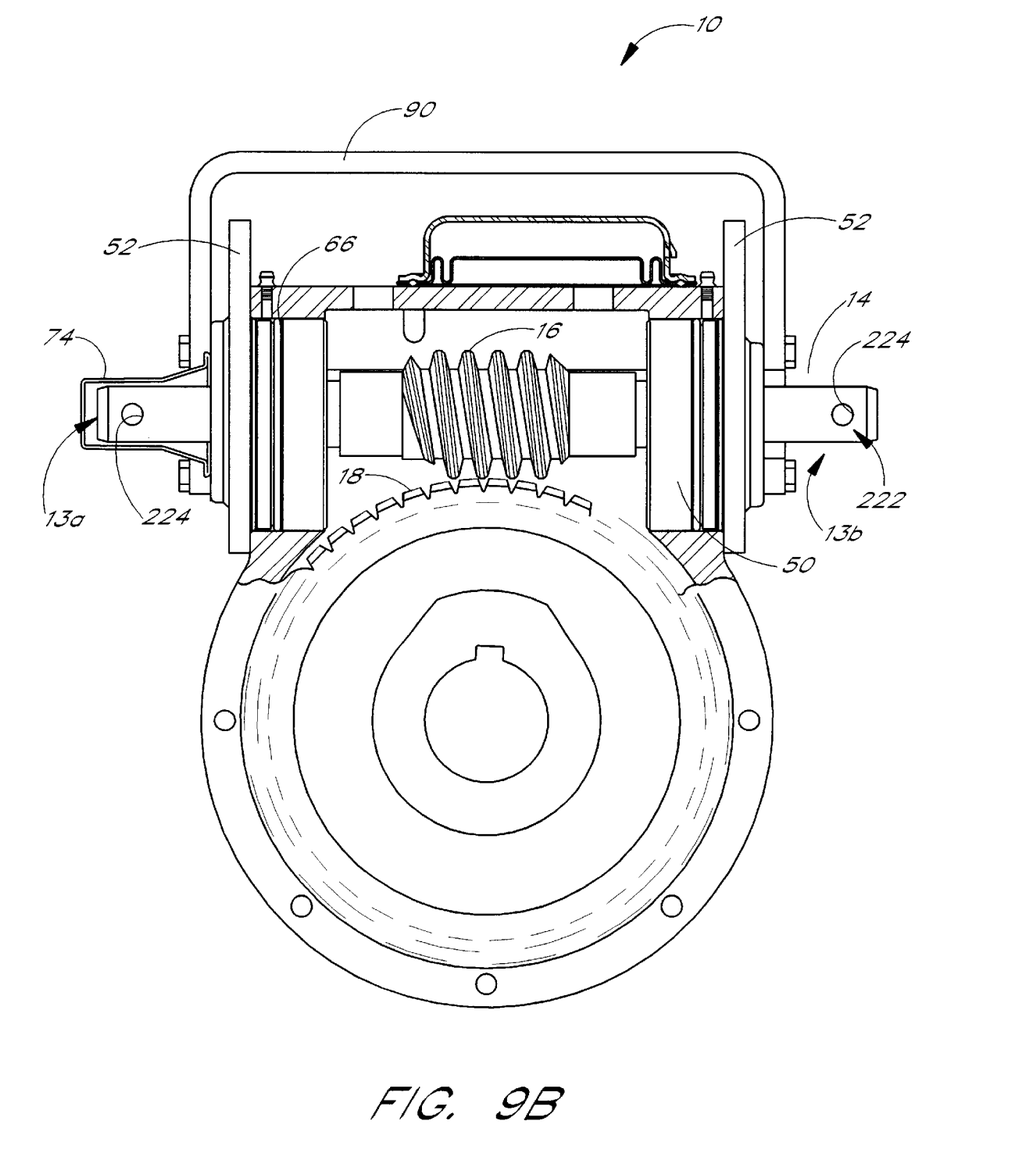
FIG. 9B is a partially cut-away front view of the gearbox of FIG. 1 showing the worm and bull gears in the disengaged, freewheeling position. The cut-away view is taken along line 9—9 of FIG. 8.

FIGS. 8, 9A and 9B show the practical effect of rotating the eccentric shaft support 50 and the accompanying linear travel of the driveshaft 14. In FIG. 9A, the worm gear 16 and bull gear 18 are shown engaged. The handle 90 has been pulled forward to the engaged position, as shown in shadow lines in FIG. 8. In FIG. 9B, the handle 90 has been drawn back, rotating the eccentric shaft support 50. The driveshaft 14 has thus been linearly moved, disengaging the worm gear 16 from the bull gear 18. With the gears disengaged, the unit may freewheel.

Referring back to FIG. 7, the end plate 52 has a substantially circular hole 110 through which portions of the eccentric shaft support 50 extend. Rotation stops 112, 114 in the form of ridges extend into this hole 110 from the main body of the end plate 52. When an eccentric shaft support 50 is rotated, the threaded bosses 84 come in contact with one of these rotation stops 112, 114, preventing further rotation of the eccentric shaft support 50 in that direction.

FIG. 7 uses solid lines to show the position of the eccentric shaft support 50 when the gears are engaged. The threaded boss 84 is shown in contact with the engagement rotation stop 112. In this orientation, the driveshaft axis of rotation B is at the position where the associated worm gear 16 is in optimal engagement with the bull gear 18, as shown in FIG. 9A. Further rotation of the eccentric shaft support 50 would result in too tight of a fit between the gears. Less rotation would result in too loose of a fit.

FIG. 7 uses dotted lines to show the position of the eccentric shaft support 50' when the gears are disengaged. The threaded boss 86' is shown in contact with the disengagement rotation stop 114. The driveshaft axis of rotation B' is at a point where the worm gear 16 is out of engagement with the bull gear 18, as shown in FIG. 9B.

Since the teeth of the worm gear 16 and bull gear 18 overlap about 0.320 inches when engaged, the distance traveled by the driveshaft 14, 14' between points B and B' must exceed this distance in the preferred embodiment. Preferably, the travel distance between B and B' is 0.400 inches, thus enabling disengagement and providing for an approximately 20% buffer area between the gears when disengaged. To accomplish this travel, an offset distance/ radius of curvature C of 0.400 inches is preferably used along with a 60° angle of rotation E of the eccentric shaft support 50 between the rotation stops 112, 114.

It is contemplated that a wide range of appropriate radii of curvature C may be used. Thus, for example, it is preferred that in order to keep the gearbox 10 compact in size, the radius of curvature C be approximately ⅕ of the pitch diameter of the worm gear 16. Further, a radius of curvature C in the range of from ⅒ to ½ of the pitch diameter of the worm gear 14 would be preferred in accordance with this invention. Further, a radius of curvature C greater than ½ of the pitch diameter and up to or even greater than the full pitch diameter of the worm gear 16 may be useful in some situations.

It is contemplated that the necessary linear travel of the worm gear 16 can be accomplished using a lesser offset distance C if the angle of rotation E is greater. A lesser offset distance C enables use of a smaller eccentric shaft support 50 and thus a smaller gearbox housing 12. However, movement of the handle 90 is limited by the output shaft 20 in one direction and the surface to which the gearbox 10 is mounted in the other. Thus, a maximum possible angle of rotation E when the handle 90 is so limited is about 90°. Another consideration is that actuation of the handle 90 by a user will be inconvenient when in close proximity to the output shaft 20, output flange 22, and attached wheel 210.

An angle of rotation E of less than 60° is also feasible, but will require a greater offset distance C and thus a larger gearbox housing 12. Such increases in housing 12 size will also necessitate an output shaft 20 of increased length.

Accordingly, an angle of rotation E in the range of 45° to 90° would be feasible for the present worm wheel gearbox 10 embodiment. To minimize the gearbox housing 12 size and maximize accessibility of the handle 90 to the user, the preferred angle of rotation E of 60° is considered optimal.

Those of skill in the art will appreciate that an alternative embodiment of the present worm wheel gearbox 10 may be adapted to be mounted such that rotation of the handle 90 is less constricted on the side of the gearbox 10 opposite the output shaft 20 than described above for the preferred embodiment. In such an embodiment, an angle of rotation E of up to 180° is possible. Thus, a greater angle of rotation E and correspondingly lesser offset distance C would be required than that presently described for the preferred embodiment.

FIGS. 9A and 9B show that each of the portions 13a, 13b of the driveshaft 14 extending from the gearbox 10 have an axle connector hole 224 disposed therein. Each axle connector hole 224 comprises a connect point 222 and enables connection to the axle 214, which is driven by the motor 212. Either portion 13a, 13b of the driveshaft 14 can be linked to the axle 214.

Figure 10:
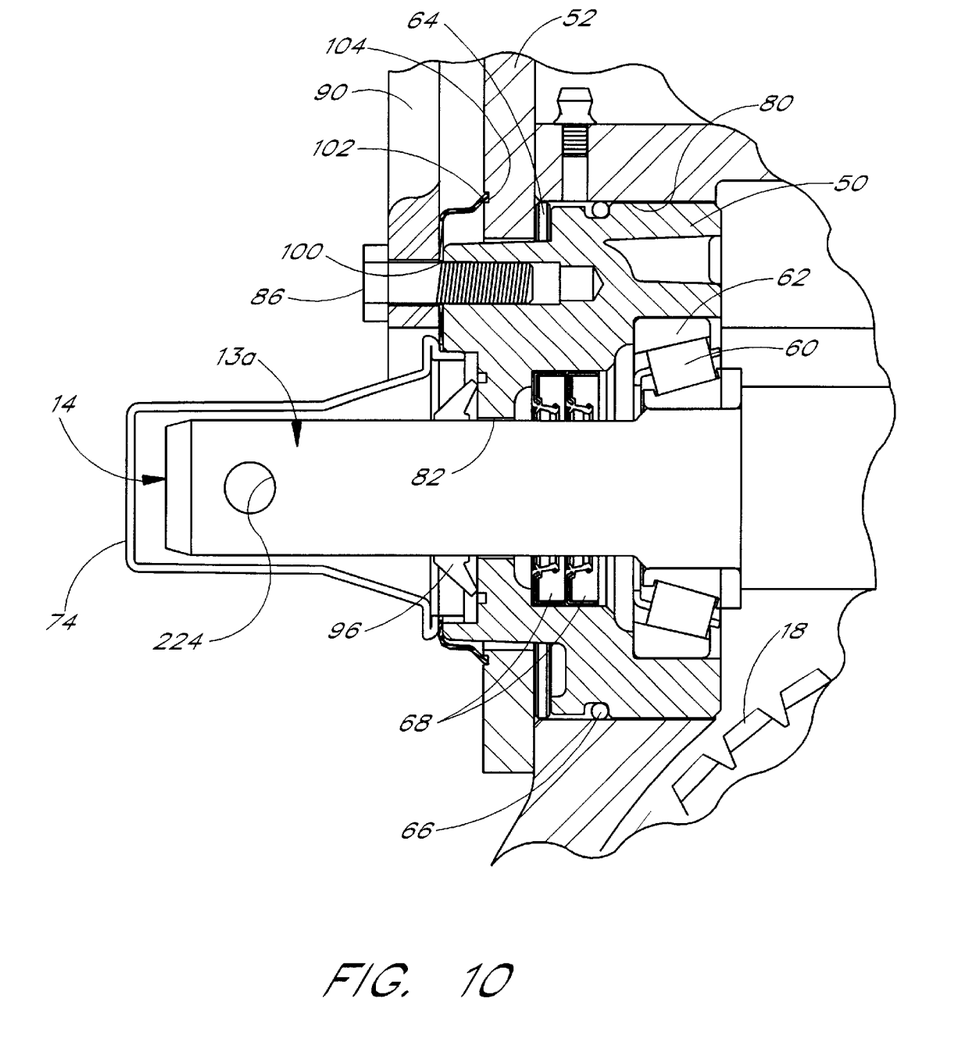
FIG. 10 is an enlarged view of an eccentric shaft support as installed into the gearbox of FIG. 1 taken along lines 10—10.

FIG. 10 shows a close-up cross sectional view of an eccentric shaft support 50 disposed in the cylindrical acceptor portion 80 of the gearbox housing 12. An O-ring 66 surrounds the eccentric shaft support 50 so as to effectuate a seal, keeping oil from escaping the gearbox 10. The driveshaft 14 is supported by bearings 60 disposed in the eccentric shaft support 50. Oil seals 68 provide a seal to keep oil from escaping the gearbox 10 along the shaft 14. The end plate 52 ensures the eccentric shaft support 50 remains disposed in its place within the housing 12. A dust cap 92 fits onto the end plate 52 to prevent dust, silt, mud and other foreign matter from invading the eccentric shaft support 50. A rubber seal 96 surrounds the driveshaft 14 and further prevents invasion of foreign matter into the gearbox 10.

Dust caps 92 are preferably disposed on either side of the gearbox housing 12. An eccentric hole 98 is formed in the dust cap 92 allowing the driveshaft 14 to extend therethrough. The hub cap 74 is press fit into the eccentric hole 98 and encloses the portion 13a of the driveshaft 14 that is not linked to the axle 214. The dust cap 92 is also sized to allow the rubber seal 96 to fit around the driveshaft 14 and further complete a seal. The dust cap 92 further comprises boss holes 100 corresponding to the threaded bosses 84 of the eccentric shaft support 50. These boss holes 100 accommodate the threaded fasteners 86 that attach the handle 90 to the eccentric shaft support 50. The ridge 102 of the dust cap 92 fits into a canal 104 formed in the end plate 52. The dust cap 92 flares near its ridge 102 as it enters the canal 104. The flared ridge 102 communicates dust, mud, silt and other matter that may be working its way along the end plate 52 away from the gearbox 10.

With particular reference to FIGS. 4, 7, and 8, the end plates 52 extend beyond the top surface of the gearbox housing 12. Each end plate 52 has an engagement lock hole 120 and a disengagement lock hole 122. The handle 90 also has a pair of handle lock holes 124. The lock holes are arranged so that when the gears are engaged, the handle lock holes 124 are aligned with the engagement lock holes 120 of the end plates 52. A clip 126 may then be extended through both holes 120, 124 to lock the handle 90 in place relative to the end plates 52 and thus act as a support to help keep the gears in the engaged position.

Similarly, when the gears are disengaged, the handle lock holes 124 are aligned with the disengagement lock holes 122. A clip 126 is advantageously inserted through these aligned holes 122, 124 to lock the handle 90 in place and thus prevent inadvertent engagement of the worm gear 16 and the bull gear 18. FIGS. 4 and 8 similarly show the handle 90 in the disengaged position with a clip 126 extending through aligned lock holes 122, 124. FIG. 8 also shows, in shadow lines, the handle 90 in the engaged position with a clip 126' extending through aligned lock holes 120, 124. Those skilled in the art will appreciate that a variety of clips or pins of varying strength and construction may be appropriately used to lock the handle 90 in place relative to the end plates 52.

Figure 11:
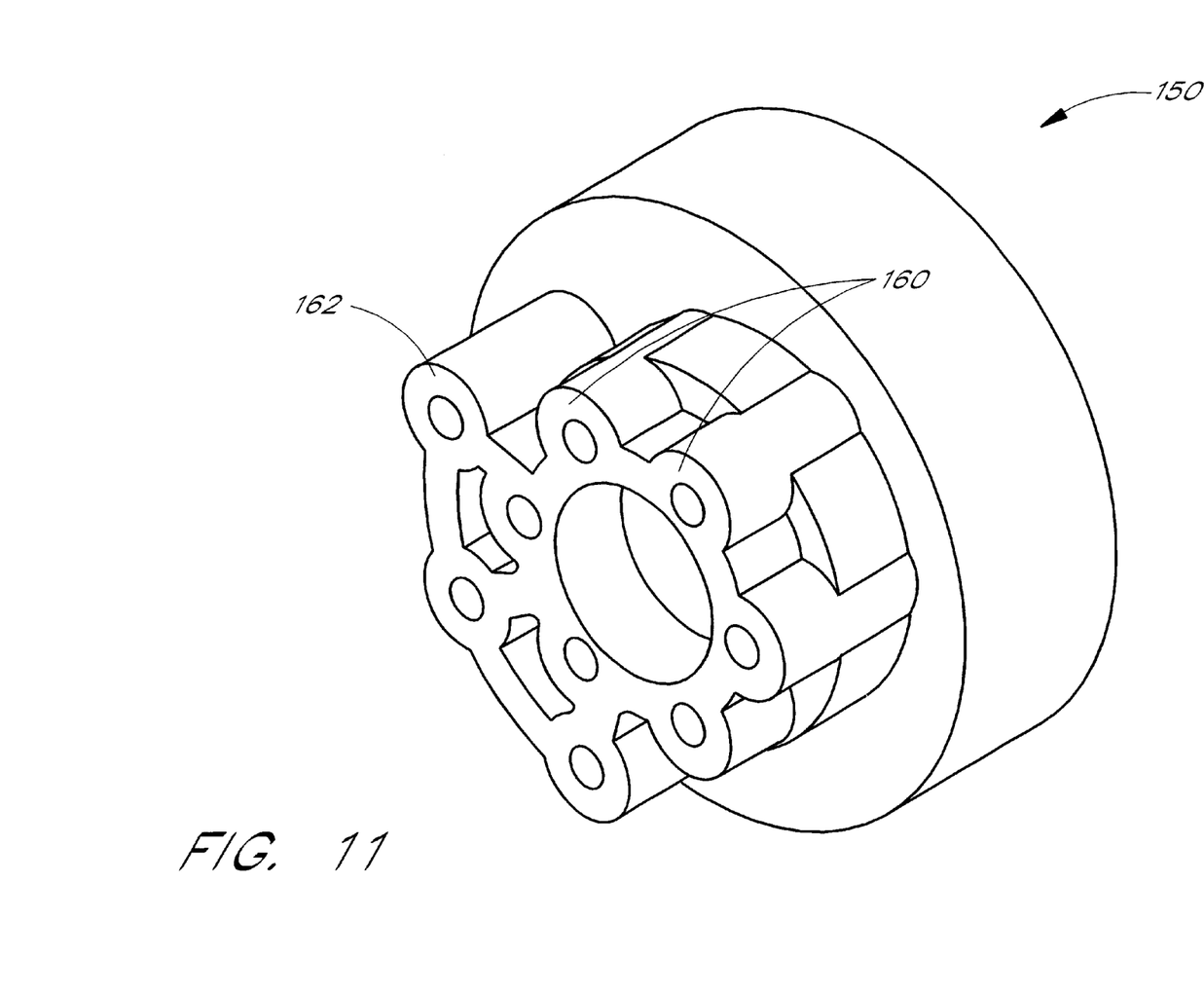
FIG. 11 is a perspective view of another embodiment of an eccentric shaft support.

Referring next to FIG. 11, another embodiment of an eccentric shaft support 150 is shown. In some applications of the current invention, a hydraulic motor (not shown) is mounted onto one of the eccentric shaft supports 150 and drives the driveshaft 14. Motor mount bosses 160 are formed on the eccentric shaft support 150 to facilitate mounting of the motor thereon. Threaded bosses 162 are formed on the eccentric shaft support 150 to enable attachment of the handle 90. In this arrangement, operation of the motor not only directly rotates the driveshaft 14, but also tends to rotate the eccentric shaft supports 150. Since this embodiment of the eccentric shaft support 150 operates similarly to the previously-discussed embodiment 50, such rotation of the rotatable shaft mounts 150 could cause disengagement of the gears during operation. Accordingly, engagement lock holes 120 in the end plates 52 and handle lock holes 124 are configured to accept a weight-bearing clip 126 or pin inserted therethrough when the handle and engagement lock holes 124, 120 are aligned. such a weight-bearing clip 126 or pin would hold the handle 90 and the attached eccentric shaft support mount 150 in place relative to the end plates 52. thus, disengaging rotation is prevented.

The bearing surfaces of the eccentric shaft supports 50, 150 are lubricated to ensure easy rotation when the handle 90 is actuated. No extra tools are typically necessary. However bar holds 130 are disposed on the handle 90 and enable a bar (not shown) to be inserted into the bar holds 130, if necessary, to provide extra torque to ease actuation of the handle 90.

Although this invention has been disclosed in the context of certain preferred embodiments, it will be understood by those skilled in the art that the present invention extends beyond the specific disclosed embodiments to other alternative embodiments of the invention. For example, use of this worm wheel gearbox with equipment of various sizes will necessitate using parts of different dimensions than described herein. Thus, it is intended that the scope of the present invention herein disclosed should not be limited by the particular disclosed embodiments described above, but should be determined only by reference to the claims that follow.

What is claimed is:

1. A gear assembly comprising a worm gear and a generally circular bull gear, the assembly comprising an axle support disposed in a casing, the axle support adapted to rotate relative to the casing and to support an axle extending therethrough, the axle having a worm disposed thereon, and the axis of rotation of the axle being offset from the axis of rotation of the axle support;

an actuator attached to the axle support, so that when the actuator is moved relative to the casing, the axle support rotates and the axis of rotation of the axle moves along an arcuate path between a first point and a second point; and the worm gear drivingly engages the bull gear when the axis of rotation of the axle is at the first point and the bull gear rotates independent of the worm gear when the axis of rotation of the axle is at the second point.

2. The gearbox of claim 1, further comprising an o-ring, oil seals and a dust cover to prevent outside material and fine silt from entering the gearbox, and the gears within the gearbox are bathed in a high capacity worm gear lubricant.

3. The gearbox of claim 1, wherein the actuator is in the form of a bale, and the bale is attached to the axle support.

4. The gear assembly of claim 1, further comprising stopping means for preventing rotation of the axle support beyond predetermined points.

5. The gear assembly of claim 4, wherein the stopping means is disposed on an end plate having a hole adapted to accept portions of the axle support and the axle, the hole comprising a first and second ridge, the ridges adapted to contact a portion of the axle support and prevent further rotation of the axle support, the first ridge adapted to stop further rotation of the axle support at a point when the worm is engaged with the bull gear and the second ridge adapted to stop further rotation of the axle support at a point when the worm is completely disengaged from the bull gear.

6. The gear assembly of claim 5, further comprising locking means for locking the axle support at the engaged point and locking means for locking the axle support at the disengaged point.

7. The gear assembly of claim 6, wherein the locking means comprises a clip.

8. The gear assembly of claim 4, wherein the stopping means prevents rotation of the axle support beyond the first point in one rotational direction and the second point in an opposite rotational direction.

9. A sealed gearbox for transmitting rotation between a first shaft and a second shaft, the first shaft having a worm gear disposed thereon, the second shaft in communication with a bull gear, the worm gear being movable into and out of engagement with the bull gear;

the first shaft being supported by support bodies rotatable disposed in the gearbox, the axis of rotation of the first shaft being eccentric from the axis of rotation of the support bodies, and the first shaft moves along an arcuate path when the support bodies are rotated, thus facilitating engagement and disengagement of the worm gear and bull gear;

caps disposed on opposing ends of the gearbox, each cap comprising:
a hole formed to accommodate the first shaft; and
a substantially circular, flared ridge, the flared ridge being received into a circular canal formed in an end plate affixed to the gearbox;

wherein the cap protects against foreign matter coming in contact with the support bodies.

10. The gearbox of claim 9, wherein the first shaft is the input shaft and the second shaft is the output shaft.

11. The gearbox of claim 9, wherein the bull gear is generally circular in shape and is adapted to rotate substantially without restriction when the worm gear is not engaged with the bull gear.

12. A gear assembly comprising
a worm gear,
a bull gear mounted adjacent said worm gear, the bull gear having a generally circular shape,
a rotatable worm gear mount having an opening therethrough permitting one end of said worm gear to pass therethrough, said one end of said worm gear rotatably mounted in said opening in said worm gear mount,
the axis of rotation of said rotatable mount parallel to the axis of rotation of said worm gear, said worm gear axis of rotation and said rotatable mount axis of rotation offset such that said worm gear may be moved into and out of engagement with said bull gear when said worm gear mount is rotated;
wherein said bull gear is driven by said worm gear when the worm gear is in engagement with said bull gear, and said bull gear is substantially free to rotate independent of said worm gear when said worm gear is out of engagement with said bull gear.

13. The gear assembly of claim 12 wherein the offset distance between the worm gear axis and the rotatable mount axis is greater than 1/10 of the pitch diameter of the worm gear.

14. The gear assembly of claim 12 wherein bearings for the rotatable mount and bearings for the worm gear are substantially concentric.

15. A gear assembly as in claim 12, wherein the bull gear rotatably communicates with a wheel mount, the wheel mount adapted to accept a wheel thereon, and the wheel mount rotates freely when the worm gear is out of engagement with the bull gear.

16. The assembly of claim 15 in combination with a frame member, wherein the gear assembly is rotatably mounted to the frame member so that the wheel mount can be moved between an operational orientation and a towable orientation.

17. The assembly of claim 16, in combination with a towable irrigation system, the irrigation system comprising at least one truss span supported by at least one tower, the frame member being incorporated into the tower.

18. The assembly of claim 16, in combination with a towable conveyor system, the conveyor system comprising a conveyor disposed on a frame, the frame member being incorporated into the frame.

19. The assembly of claim 16, wherein the gear assembly is substantially contained within a gearbox casing.

20. The assembly of claim 19, wherein the gearbox casing is substantially sealed.

21. The assembly of claim 19 additionally comprising a cap disposed on an end of the gearbox casing, the cap comprising:
a hole adapted to accommodate an axle, the axle having the worm gear mounted thereon; and
a flared ridge, the flared ridge being received into a complementary canal formed in an end plate of the gearbox casing.

22. The gear assembly of claim 12, wherein the rotatable worm gear mount is supported by a gearbox casing, and an end plate is disposed on the casing adjacent the mount, the end plate having a hole formed therethrough and a portion of the mount extending through the hole, the portion of the mount extending through the hole being adapted to move along a circular path when the mount rotates, a first and second ridge integrally formed with the end plate and extending into the hole in a manner so as to engage the portion and prevent the portion from moving past the ridges.

23. The assembly of claim 22, wherein the first ridge is positioned so that the portion engages the first ridge when the worm gear is in engagement with the bull gear.

24. The assembly of claim 22, wherein the portion of the mount extending through the hole communicates with a handle.

25. The assembly of claim 12, wherein the rotatable worm gear mount is adapted to rotate about 45°–90° between a first position wherein the worm gear is engaged with the bull gear and a second position wherein the worm gear is not engaged with the bull gear.

26. The assembly of claim 25, wherein the mount rotates about 60° between the first and second positions.

27. The assembly of claim 25 additionally comprising rotation stops adapted to confine rotation of the mounts to between the first and second positions.

28. The assembly of claim 25 additionally comprising a releasable clip adapted to lock the mount in the first position.

29. The assembly of claim 25 additionally comprising a releasable clip adapted to lock the mount in the second position.

30. A towable automatic irrigation system comprising at least one truss span supported by towers, each tower being disposed on wheels, the wheels capable of being oriented in both an operating orientation and a towable orientation, at least one of the wheels being attached to the tower by way of a gearbox, the gearbox comprising:

a worm disposed on a driveshaft, the driveshaft supported by at least one rotatable driveshaft mount, the driveshaft having an axis of rotation eccentric of the axis of rotation of the rotatable driveshaft mount, and when said at least one rotatable driveshaft mount is rotated, the position of the worm within the gearbox is changed between a first position and a second position; and a generally circular bull gear rotatably communicating with the wheel, the bull gear being drivingly engaged with the worm when the worm is in the first position and the bull gear being rotatable independent of the worm when the worm is in the second position;

wherein the worm is placed in the second position to allow the irrigation system to be towed.

31. The towable automatic irrigation system of claim 30, wherein the gearbox further comprises at least one end plate comprising first and second rotation stops, the first rotation stop preventing rotation of the rotatable driveshaft mount beyond the first position and the second rotation stop preventing rotation of the rotatable driveshaft mount beyond the second position.

32. The towable automatic irrigation system of claim 31, wherein the bull gear is disposed on an output shaft and the output shaft drives a wheel, and the wheel may freely rotate when the worm is placed in the second position.

33. The towable automatic irrigation system of claim 31 additionally comprising a hydraulic motor mounted directly to one of said at least one rotatable driveshaft mount.

34. The towable automatic irrigation system of claim 31, further comprising locking means for locking said at least one rotatable driveshaft mount at the first position and locking means for locking said at least one rotatable driveshaft mount at the second position.

35. The irrigation system of claim 30, additionally comprising a motor drivingly connected to the driveshaft.

36. The irrigation system of claim 35, wherein the driveshaft is detachable from the motor.

37. The irrigation system of claim 30, wherein the gearbox is substantially sealed from the environment.

38. The irrigation system of claim 30, wherein the wheels are rotatable relative to the tower.

39. The irrigation system of claim 30, additionally comprising a handle connected to at least one of said at least one mount.

40. A gearbox for a worm and bull gear assembly, the gearbox comprising:

a pair of axle supports disposed in the gearbox on opposite sides, the axle supports adapted to rotate and to support an axle extending therethrough, the axle having a worm disposed thereon, and the axis of rotation of the axle being offset from the axis of rotation of the axle supports;

a handle extending between and attached to each of the axle supports, so that when the handle is actuated, the axle supports rotate in concert and the axis of rotation of the axle moves linearly along an arcuate path; and stopping means for preventing rotation of the axle supports beyond predetermined points, the stopping means being disposed on a pair of end plates, each having a hole adapted to accept portions of the axle supports and the axle, each hole comprising a first and second ridge, the ridges adapted to contact a portion of the axle supports and prevent further rotation of the axle supports, the first ridge adapted to stop further rotation of the axle supports at a point when the worm is engaged with the bull gear and the second ridge adapted to stop further rotation of the axle supports at a point when the worm is completely disengaged from the bull gear.

41. The gearbox of claim 40, further comprising locking means for locking the axle supports at the engaged point and locking means for locking the axle supports at the disengaged point.

42. The gearbox of claim 41, wherein the locking means comprises clips.

* * * * *